US012711666B2

(12) United States Patent
Lindberg et al.

(10) Patent No.: US 12,711,666 B2
(45) Date of Patent: Aug. 18, 2026

(54) COMPRESSION TECHNIQUES FOR BURN-IN STATISTICS OF DISPLAY SCREENS

(71) Applicant: Apple Inc., Cupertino, CA (US)

(72) Inventors: Lars M. Lindberg, Bjaerred (SE); Ali Sazegari, Los Altos, CA (US); Christian T. Martelock, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 303 days.

(21) Appl. No.: 18/425,493

(22) Filed: Jan. 29, 2024

(65) Prior Publication Data

US 2025/0245859 A1 Jul. 31, 2025

(51) Int. Cl.
*G06T 9/00* (2006.01)

(52) U.S. Cl.
CPC ...................................... *G06T 9/00* (2013.01)

(58) Field of Classification Search
CPC ........................................................ G06T 9/00
See application file for complete search history.

(56) References Cited

U.S. PATENT DOCUMENTS 6,681,053 B1 * 1/2004 Zhu .......................... G09G 5/28 382/258
2017/0127062 A1 * 5/2017 Zhao .................... H04N 19/126
2018/0247589 A1 * 8/2018 Lindberg ................. G09G 3/20
2018/0329745 A1 * 11/2018 Park ...................... G06F 9/5005
2019/0373283 A1 * 12/2019 Lindberg ............. H04N 19/186
2025/0245859 A1 * 7/2025 Lindberg .................. G06T 9/00

* cited by examiner

*Primary Examiner* — Delomia L Gilliard
(74) *Attorney, Agent, or Firm* — Dickinson Wright RLLP

(57) ABSTRACT

Techniques for pre-processing image data for compression are disclosed. According to some embodiments, the techniques include receiving the image data, where the image data comprises a plurality of pixels, and each pixel of the plurality of pixels comprises a plurality of sub-pixel values. Various operations—including quantization, color space transformation, de-interleaving, prediction, and encoding operations—can be performed on the plurality of pixels/sub-pixel values to yield modified image data. In some cases, the modified image data is arranged, and possesses particular characteristics, such that when it is compressed, a substantially improved compression ratio can be achieved in comparison to the compression ratio that otherwise would achieved when compressing the (unmodified) image data.

20 Claims, 11 Drawing Sheets

220

Step 2 – Apply a color space transformation function to each sub-pixel value group

Sub-Pixel Value Group 222

| $R_{1,1}$ | $G_{1,2}$ | $B_{1,3}$ | $R_{1,4}$ | $G_{1,5}$ | $B_{1,6}$ | ••• | $B_{1,C}$ |
|---|---|---|---|---|---|---|---|
| $R_{2,1}$ | $G_{2,2}$ | $B_{2,3}$ | $R_{2,4}$ | $G_{2,5}$ | $B_{2,6}$ | ••• | $B_{2,C}$ |
| $R_{3,1}$ | $G_{3,2}$ | $B_{3,3}$ | $R_{3,4}$ | $G_{3,5}$ | $B_{3,6}$ | ••• | $B_{3,C}$ |
| ⋮ | ⋮ | ⋮ | ⋮ | ⋮ | ⋮ | | ⋮ |
| $R_{R,1}$ | $G_{R,2}$ | $B_{R,3}$ | $R_{R,4}$ | $G_{R,5}$ | $B_{R,6}$ | ••• | $B_{R,C}$ |

Quantized Sub-Pixel Values 216

$$
\begin{aligned}
Co &= R - B \\
U &= B + (Co >> 1) \\
Cg &= G - U \\
Y &= U + (Cg >> 1)
\end{aligned}
$$

Color Space Transformation Functions 224

Color Space Transformed Sub-Pixel Value Group 228

| $Y_{1,1}$ | $Co_{1,2}$ | $Cg_{1,3}$ | $Y_{1,4}$ | $Co_{1,5}$ | $Cg_{1,6}$ | ••• | $Cg_{1,C}$ |
|---|---|---|---|---|---|---|---|
| $Y_{2,1}$ | $Co_{2,2}$ | $Cg_{2,3}$ | $Y_{2,4}$ | $Co_{2,5}$ | $Cg_{2,6}$ | ••• | $Cg_{2,C}$ |
| $Y_{3,1}$ | $Co_{3,2}$ | $Cg_{3,3}$ | $Y_{3,4}$ | $Co_{3,5}$ | $Cg_{3,6}$ | ••• | $Cg_{3,C}$ |
| ⋮ | ⋮ | ⋮ | ⋮ | ⋮ | ⋮ | | ⋮ |
| $Y_{R,1}$ | $Co_{R,2}$ | $Cg_{R,3}$ | $Y_{R,4}$ | $Co_{R,5}$ | $Cg_{R,6}$ | ••• | $Cg_{R,C}$ |

Color Space Transformed Sub-Pixel Values 226

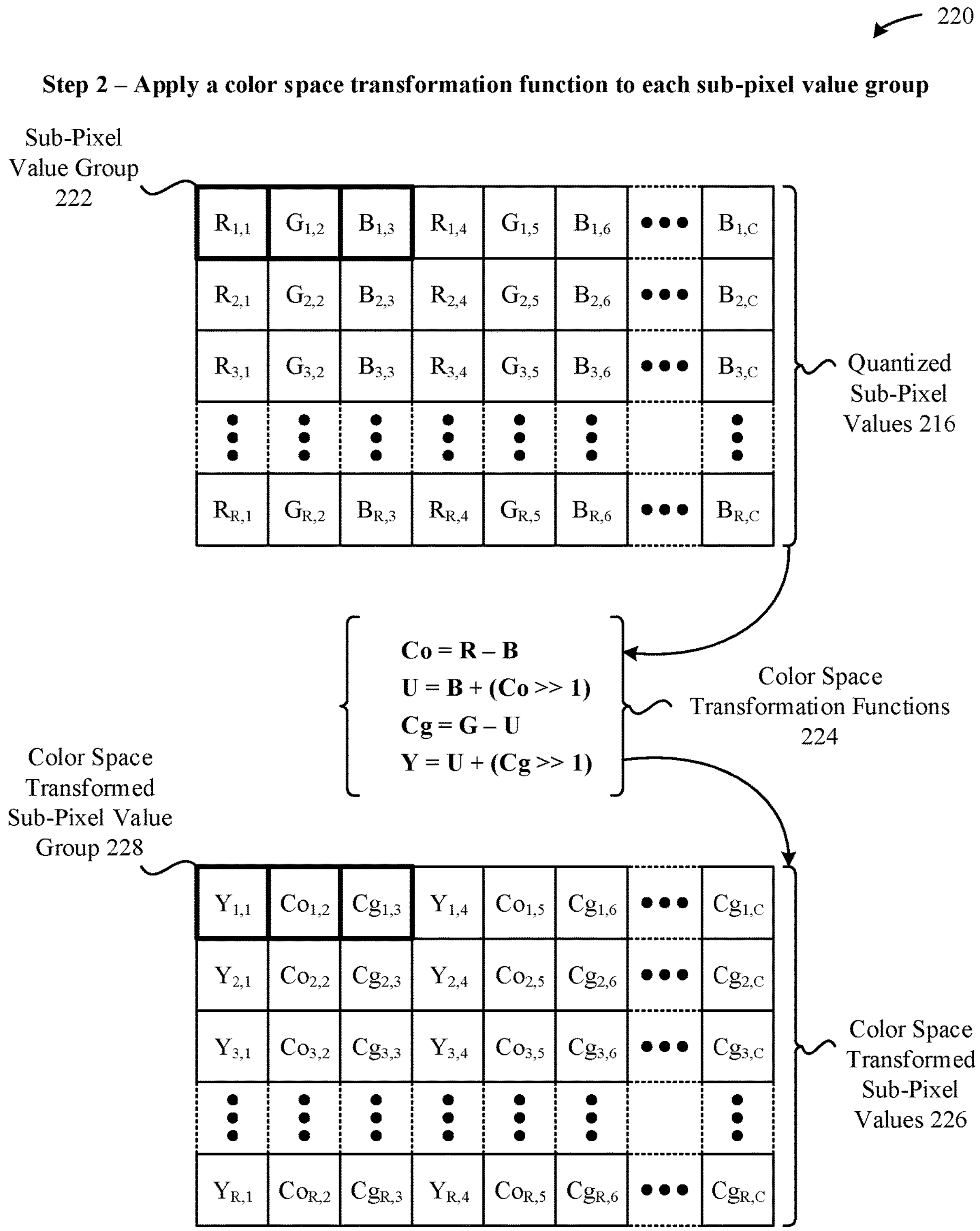

*FIG. 2B*

Step 3 – Apply a de-interleaving function to each row of sub-pixel value groups

240

Step 4 – Replace sub-pixel values with prediction error (PE) sub-pixel values

Step 5 – Encode each prediction error (PE) sub-pixel values using a respective encoding model

Prediction Error (PE) Sub-Pixel Values 244

| | | | | | | | | | | | |
|---|---|---|---|---|---|---|---|---|---|---|---|
| $PE_{1,1}$ | $PE_{1,4}$ | ••• | $PE_{1,C}$ | $PE_{1,2}$ | $PE_{1,5}$ | ••• | $PE_{1,C}$ | $PE_{1,3}$ | $PE_{1,6}$ | ••• | $PE_{1,C}$ |
| $PE_{2,1}$ | $PE_{2,4}$ | ••• | $PE_{2,C}$ | $PE_{2,2}$ | $PE_{2,5}$ | ••• | $PE_{2,C}$ | $PE_{2,3}$ | $PE_{2,6}$ | ••• | $PE_{2,C}$ |
| $PE_{3,1}$ | $PE_{3,4}$ | ••• | $PE_{3,C}$ | $PE_{3,2}$ | $PE_{3,5}$ | ••• | $PE_{3,C}$ | $PE_{3,3}$ | $PE_{3,6}$ | ••• | $PE_{3,C}$ |
| ⋮ | ⋮ | | ⋮ | ⋮ | ⋮ | | ⋮ | ⋮ | ⋮ | | ⋮ |
| $PE_{R,1}$ | $PE_{R,4}$ | ••• | $PE_{R,C}$ | $PE_{R,2}$ | $PE_{R,5}$ | ••• | $PE_{R,C}$ | $PE_{R,3}$ | $PE_{R,6}$ | ••• | $PE_{R,C}$ |

Encoding Functions 252

$PE_{R,C}$ → { Quantize (L−TL), Quantize (T−TL), Quantize (TR-T) } → Encoder Model 1, Encoder Model 2, ⋮, Encoder Model N

| | | | | | | | | | | | |
|---|---|---|---|---|---|---|---|---|---|---|---|
| $EPE_{1,1}$ | $EPE_{1,4}$ | ••• | $EPE_{1,C}$ | $EPE_{1,2}$ | $EPE_{1,5}$ | ••• | $EPE_{1,C}$ | $EPE_{1,3}$ | $EPE_{1,6}$ | ••• | $EPE_{1,C}$ |
| $EPE_{2,1}$ | $EPE_{2,4}$ | ••• | $EPE_{2,C}$ | $EPE_{2,2}$ | $EPE_{2,5}$ | ••• | $EPE_{2,C}$ | $EPE_{2,3}$ | $EPE_{2,6}$ | ••• | $EPE_{2,C}$ |
| $EPE_{3,1}$ | $EPE_{3,4}$ | ••• | $EPE_{3,C}$ | $EPE_{3,2}$ | $EPE_{3,5}$ | ••• | $EPE_{3,C}$ | $EPE_{3,3}$ | $EPE_{3,6}$ | ••• | $EPE_{3,C}$ |
| ⋮ | ⋮ | | ⋮ | ⋮ | ⋮ | | ⋮ | ⋮ | ⋮ | | ⋮ |
| $EPE_{R,1}$ | $EPE_{R,4}$ | ••• | $EPE_{R,C}$ | $EPE_{R,2}$ | $EPE_{R,5}$ | ••• | $EPE_{R,C}$ | $EPE_{R,3}$ | $EPE_{R,6}$ | ••• | $EPE_{R,C}$ |

Encoded Prediction Error (EPE) Sub-Pixel Values 254

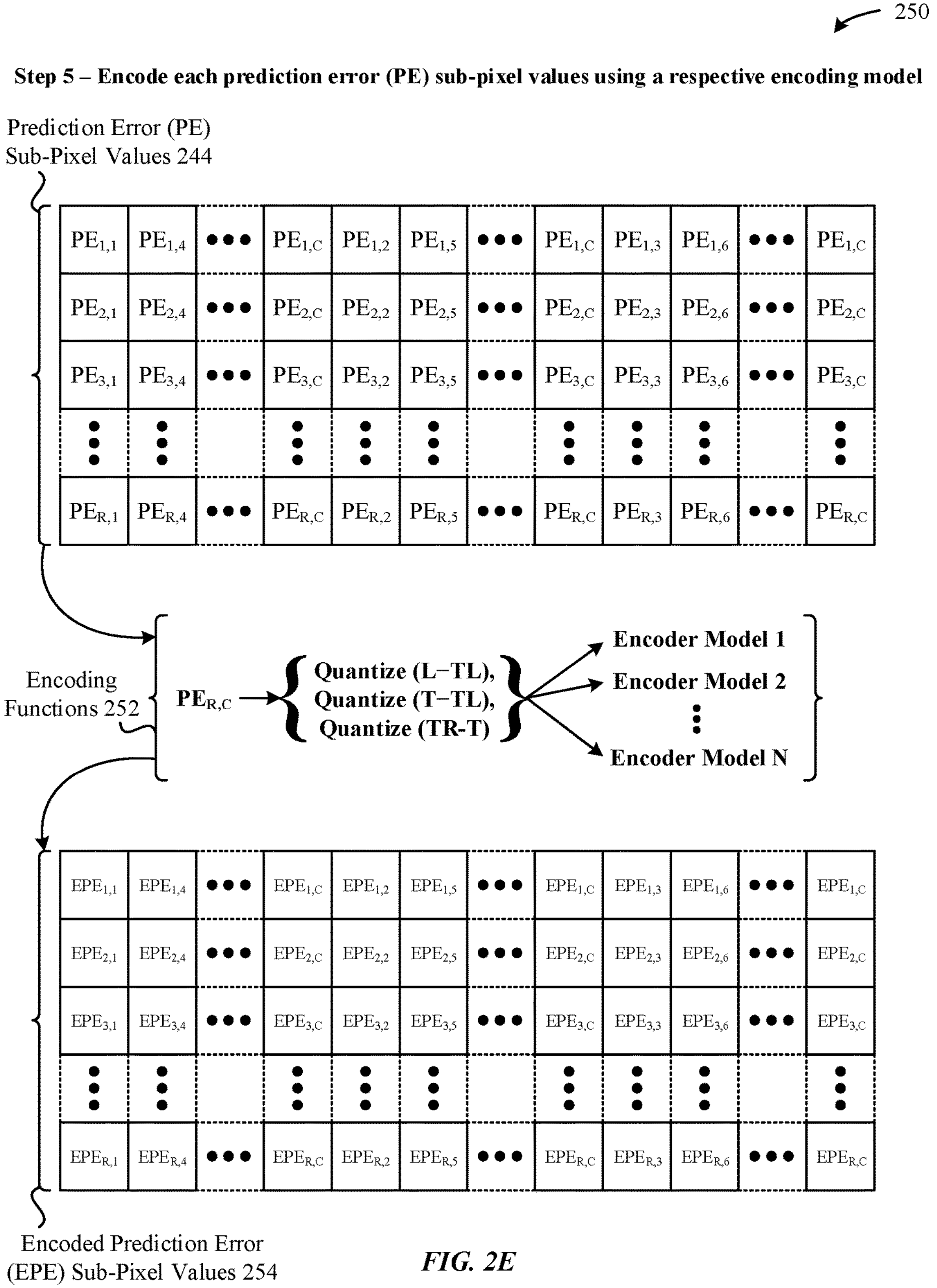

*FIG. 2E*

Step 6 – Provide the encoded prediction error (EPE) sub-pixel values to a compressor to produce a compressed multi-channel image

COMPRESSION TECHNIQUES FOR BURN-IN STATISTICS OF DISPLAY SCREENS

FIELD OF DISCLOSURE

The embodiments described herein set forth techniques for compressing image data of multiple-channel images (e.g., red, green, and blue (RGB) images) that store burn-in statistics for display screens (e.g., organic light emitting diode (OLED) screens). In particular, the techniques involve pre-processing the image data (i.e., prior to compressing it) in a manner that can enhance resulting compression ratios when the image data is compressed.

BACKGROUND

Image compression techniques involve exploiting aspects of an image to reduce its overall size while retaining information that can be used to re-establish the image to its original (lossless) or near-original (lossy) form. Different parameters can be provided to compressors to achieve performance characteristics that best-fit particular environments. For example, higher compression ratios can be used to increase the amount of available storage space within computing devices (e.g., smart phones, tablets, wearables, etc.), but this typically comes at a cost of cycle-intensive compression procedures that consume correspondingly higher amounts of power and time. In contrast, cycle-efficient compression techniques can reduce power and time consumption, but typically yield correspondingly lower compression ratios and available storage space within computing devices.

Notably, new compression challenges are arising as computing device capabilities are improved through hardware and software advancements. For example, display screens—such as organic light-emitting diode (OLED) screens, which are becoming a popular choice for personal computing devices, televisions, and so on—can degrade in a non-uniform manner over their lifespans and lead to unwanted color/brightness artifacts. To address this concern, burn-in statistics—which record historical usage information associated with pixels, regions, etc., of a given OLED screen—can be used to artificially adjust the operation of the OLED screen to substantially maintain visual uniformity throughout its operation. Notably, such burn-in statistics can take the form of a multiple-channel image that requires a considerable amount of storage space to maintain.

It is therefore desirable to establish techniques for storing the burn-in statistics in a more efficient manner.

BRIEF DESCRIPTION OF THE DRAWINGS

The disclosure will be readily understood by the following detailed description in conjunction with the accompanying drawings, wherein like reference numerals designate like structural elements.

FIGS. 2A-2F illustrate a sequence of conceptual diagrams for pre-processing image data for compression, according to some embodiments.

DETAILED DESCRIPTION

Figure 1:
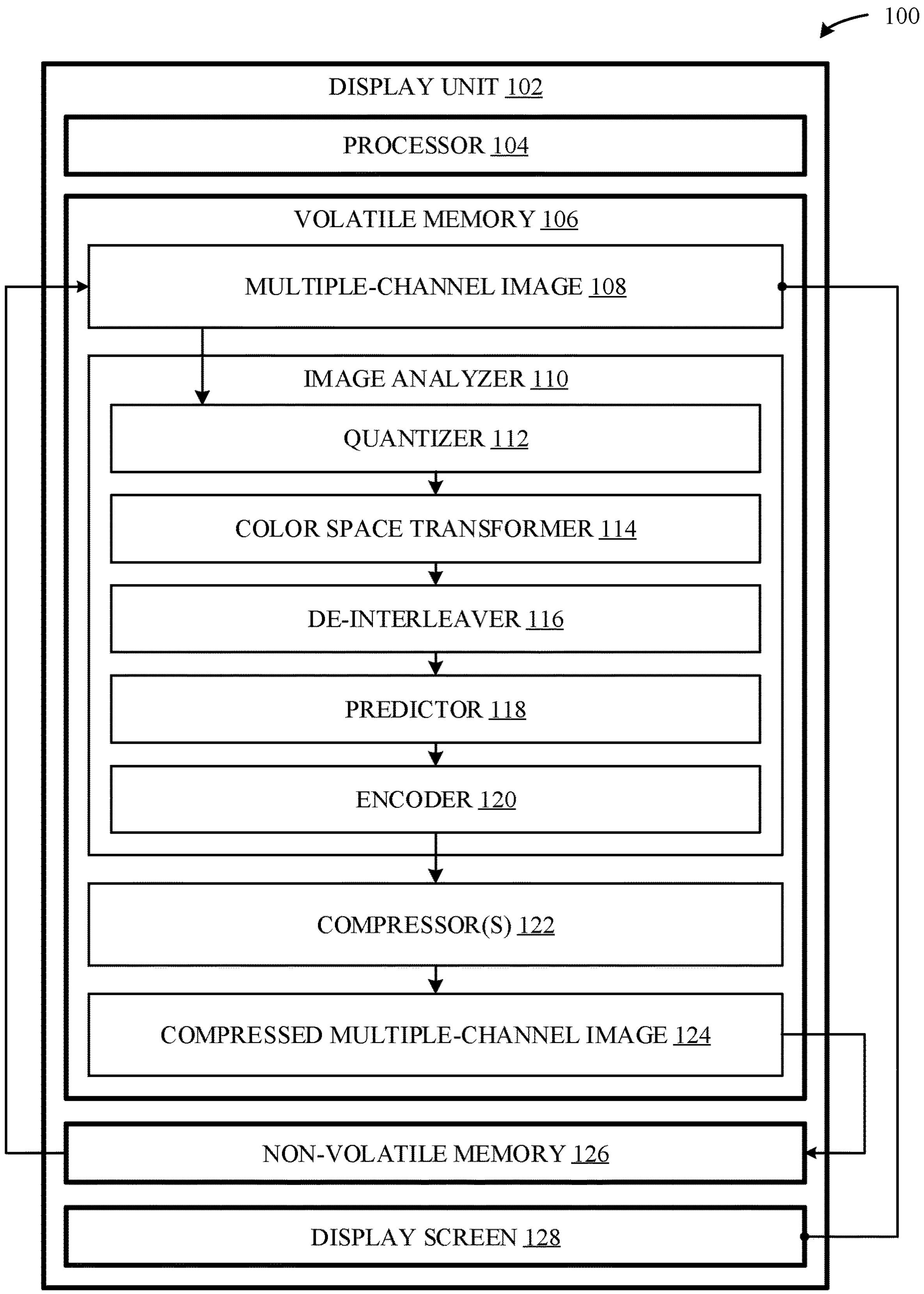
FIG. 1 illustrates an overview of a display unit that can be configured to perform the various techniques described herein, according to some embodiments.

Representative applications of methods and apparatuses according to the present application are described in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made, without departing from the spirit and scope of the described embodiments.

The embodiments described herein set forth techniques for compressing image data of multiple-channel images (e.g., 32-bit per channel red, green, and blue (RGB) images) that store burn-in statistics for display screens (e.g., organic light emitting diode (OLED) screens). In particular, the techniques involve pre-processing the image data (i.e., prior to compressing it) in a manner that can enhance resulting compression ratios when the image data is compressed.

As a brief aside, it is noted that, in the interest of unifying and simplifying this disclosure, the techniques are often described and applied to each pixel of an entire multiple-channel image, each sub-pixel value of all of the pixels, and so on. It should be understood, however, that the techniques described herein are not so limited. For example, the techniques can be applied to a group (i.e., subset) of pixels of a given multiple-channel image, where the group omits at least some other pixels of the multiple-channel image. In another example, the techniques can be applied to varying sub-pixel values of different pixels in a group of pixels. In yet another example, the techniques described herein can be implementing using a tile-based approach, which can involve dividing the multiple-channel image 108 into horizontal tiles with a width equal to that of multiple-channel image 108, but with a height that is much smaller than the multiple-channel image 108 (e.g., thirty-two pixels). Such an approach can beneficially reduce the amount of memory required to implement the techniques described herein. It is noted that the foregoing examples are not meant to be limiting, and that any number, type, form, etc., of the operations described herein can be performed on any amount, area, etc., of the image data described herein, at any level of granularity, consistent with the scope of this disclosure.

According to some embodiments, the techniques described herein can be performed by an image analyzer implemented on a computing device (e.g., a display unit that includes a display screen, a computing device that includes the display unit/display screen, etc.). Initially, the image analyzer receives image data to be compressed—e.g., burn-in statistics for the display screen—where the image data is composed of a collection of pixels. In particular, each pixel in the collection of pixels can correspond to a respective physical pixel on the display screen, where a value of the pixel represents cumulative usage information for the respective physical pixel. According to some embodiments, the cumulative usage information can be maintained by periodically sampling and aggregating the outputs (e.g., luminosities) of the physical pixels, which a display driver can then utilize to implement an adjustment process to mitigate burn-in artifacts. Accordingly, the image data can increase in size and complexity over the lifespan of the display screen (as burn-in occurs, aggregated/accumulated pixel intensities require a higher bit-depth to be stored), such that it can be desirable to compress the image data in an efficient manner to reduce the amount of storage space needed to maintain the image data.

To achieve this goal, the image analyzer can be configured to pre-process the image data to enhance the overall attainable compression ratio when the image data is ultimately provided to a compressor. According to some embodiments, each pixel in the collection of pixels (of the image data) corresponds to a respective group of sub-pixel values (e.g., a red sub-pixel value, a green sub-pixel value, a blue sub-pixel value, etc.). The image analyzer first quantizes the sub-pixel values of each pixel to produce quantized sub-pixel values. According to some embodiments, the quantization of the sub-pixel values can represent a "lossy" step in which the overall accuracy of the image data is downgraded, although the extent to which such losses are incurred can be fine-tuned/minimized by controlling the manner in which the quantizations are performed.

According to some embodiments, the image analyzer performs a series of operations against the quantized sub-pixels. In particular, a subsequent operation involves applying a color space transformation to the quantized sub-pixel values to produce transformed sub-pixel values. A subsequent operation involves applying a de-interleaving function to the transformed sub-pixel values to produce de-interleaved sub-pixel values, such that like-kind sub-pixel values are adjacent to one another. A subsequent operation involves applying predictive coding to the de-interleaved sub-pixel values to identify respective errors for the predicted sub-pixel values (i.e., differences between the actual sub-pixel values and the predicted sub-pixel values). A subsequent operation involves encoding the errors using different encoder models to produce encoded errors. A final operation involves compressing the encoded errors to produce compressed image data.

Accordingly, the techniques set forth herein involve pre-processing image data of multi-channel images in a manner that can enhance resulting compression ratios when the images are provided to compressors, thereby enabling computing devices to maintain highly accurate burn-in statistics while reducing the amount of storage space required to store the image data. A more detailed description of these techniques is provided below in conjunction with FIGS. 1, 2A-2F, and 3-6.

FIG. 1 illustrates an overview 100 of a display unit 102 that can be configured to perform the various techniques described herein. As a brief aside, it is noted that the display unit 102 can be configured to receive display data (e.g., image data, video data, etc.) from devices that are separate and distinct from the display unit 102 (e.g., set-top boxes, video game consoles, etc.). The display unit 102 can also be configured to receive display data from computing devices into which the display unit 102 is integrated (e.g., computing devices that include display units). In that regard, the computing devices into which the display unit 102 is integrated can be configured to implement all or a portion of the various techniques described herein.

Figure 4:
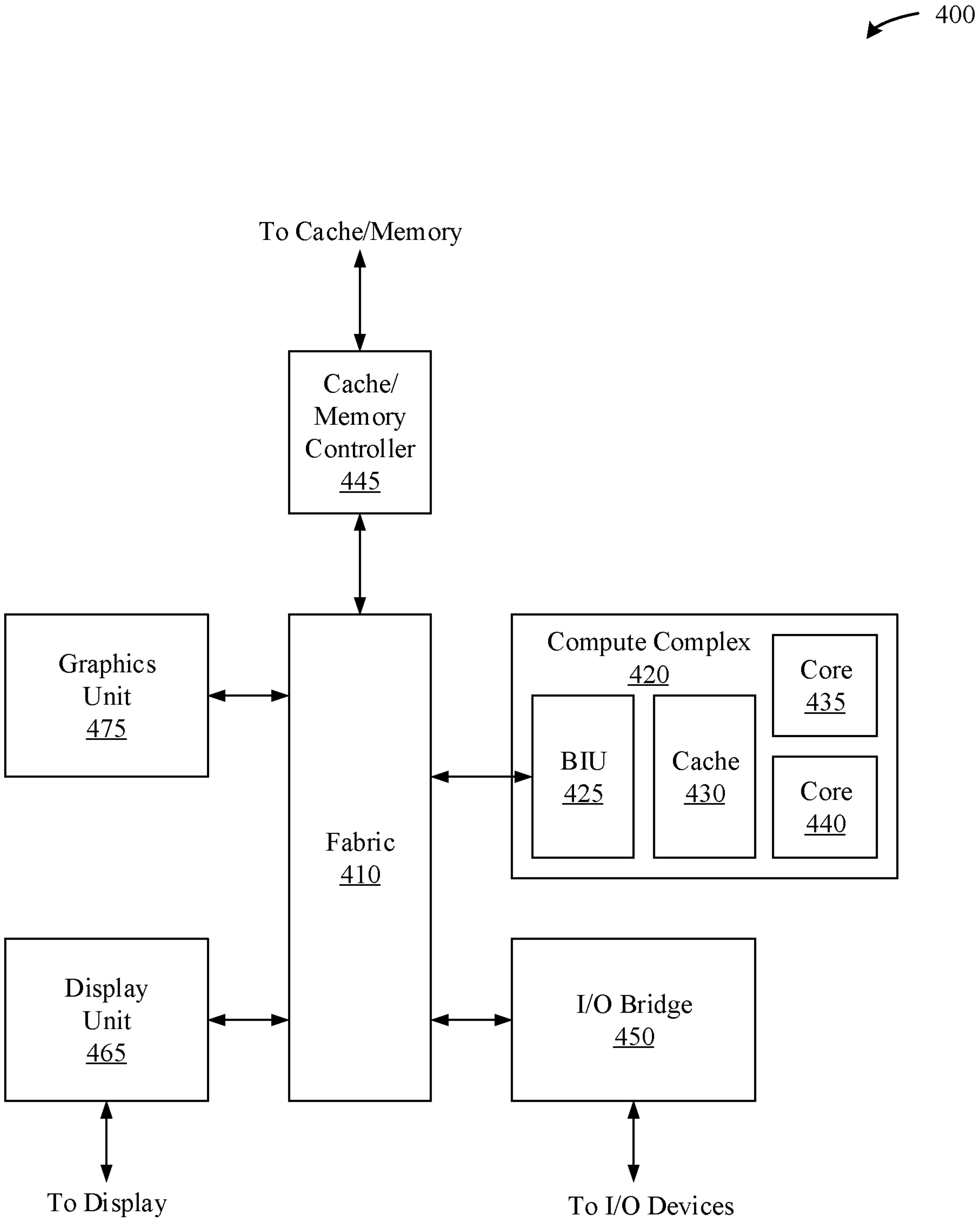
FIG. 4 illustrates a block diagram of an example embodiment of the display unit of FIG. 1, according to some embodiments.

As shown in FIG. 1, the display unit 102 can include a processor 104, a volatile memory 106, a non-volatile memory 126, and a display screen 128. It is noted that a more detailed breakdown of example hardware components that can be included in the display unit 102 is illustrated in FIG. 4, and that these components are omitted from the illustration of FIG. 1 merely in the interest of simplifying this disclosure. For example, the display unit 102 can include additional non-volatile memories (e.g., solid state drives, hard drives, etc.), other processors (e.g., a multi-core central processing unit (CPU), a multi-core graphics processing unit (GPU)), and so on. According to some embodiments, an operating system (OS) (not illustrated in FIG. 1) can be implemented on the display unit 102, where the OS can execute processes for carrying out the techniques described herein. Such processes can include, for example, an image analyzer 110 (and its internal components), one or more compressors 122, and so on.

According to some embodiments, the image analyzer 110 can be configured to pre-process image data of a multiple-channel image 108 prior to compressing the multiple-channel image 108. According to some embodiments, the multiple-channel image 108 can correspond to the display screen 128—e.g., an organic light emitting diode (OLED) screen—that is communicably coupled to the display unit 102, where the multiple-channel image 108 stores burn-in statistics for the display screen 128. It is noted that FIGS. 2A-2F and 3 (and the corresponding descriptions set forth below) provide a more detailed breakdown of the functionality of the image analyzer 110, and that the following description of the image analyzer 110 with respect to FIG. 1 is provided at a high level in the interest of simplifying this disclosure.

As shown in FIG. 1, the multiple-channel image 108 is received by the image analyzer 110. The multiple-channel image 108 can be received, for example, when certain conditions are satisfied, such as when the display screen 128 is powered off, when a computing device in which the display screen 128 is included is powered off, when an amount of time lapses (e.g., periodically in accordance with a predefined time period), and so on. According to some embodiments, and as described in greater detail herein, the multiple-channel image 108 can be composed of a collection of pixels, where each pixel in the collection of pixels corresponds to a respective physical pixel on the display screen 128, and where each pixel in the collection of pixels includes a group of sub-pixel values (e.g., a red channel, a green channel, a blue channel, etc.).

According to some embodiments, a quantizer 112 can be configured to quantize each pixel of the multiple-channel image 108—more specifically, quantize the corresponding group of sub-pixel values belonging to the pixel—to produce quantized sub-pixel values, the details of which are described below in conjunction with FIG. 2A. As previously noted herein, the quantization of the pixels can represent a "lossy" step in which the overall accuracy of the multiple-channel image 108 is downgraded, although the extent to which the accuracy is downgraded can be fine-tuned/minimized by adjusting the configuration of the quantizer 112.

Next, the quantized sub-pixel values can be provided to a color space transformer 114, a de-interleaver 116, a predictor 118, and an encoder 120, to perform a series of operations on the quantized sub-pixel values. In particular, the color space transformer 114 can be configured to perform color space transformations on the quantized sub-pixel values to produce transformed sub-pixel values, the details of which are described below in conjunction with FIG. 2B. The de-interleaver 116 can be configured to perform de-interleaving functions on the transformed sub-pixel values to produce de-interleaved sub-pixel values (such that like-kind sub-pixel values are adjacent to one another), the details of which are described below in conjunction with FIG. 2C. The predictor 118 can be configured to apply predictive coding functions on the de-interleaved sub-pixel values, the details of which are described below in conjunction with FIG. 2D. Additionally, the encoder 120 can be configured to encode the errors using different encoder models to produce encoded errors, the details of which are described below in conjunction with FIG. 2E. In turn, the encoded errors can be placed into one or more buffers (not illustrated in FIG. 1) as a data stream. Finally, one or more compressors 122 can compress the data stream to produce a compressed multiple-channel image 124, the details of which are described below in conjunction with FIG. 2F.

Notably, and according to some embodiments, the compressor(s) 122 can be configured to implement one or more compression techniques for compressing the buffer(s). Moreover, the compressor(s) 122 can be implemented in any manner to establish an environment that is most-efficient for compressing the buffer(s). For example, multiple buffers can be instantiated (where modified pixels can be pre-processed in parallel), and each buffer can be tied to a respective compressor 122 such that the buffers can be simultaneously compressed in parallel as well. Moreover, the same or a different type of compressor 122 can be tied to the buffer(s) based on the inherent formatting of the content that is placed into the buffer(s).

Accordingly, FIG. 1 provides a high-level overview of different hardware/software architectures that can be implemented by the display unit 102 in order to carry out the various techniques described herein. A more detailed breakdown of these techniques will now be provided below in conjunction with FIGS. 2A-2F and 3-6.

Figure 2A:
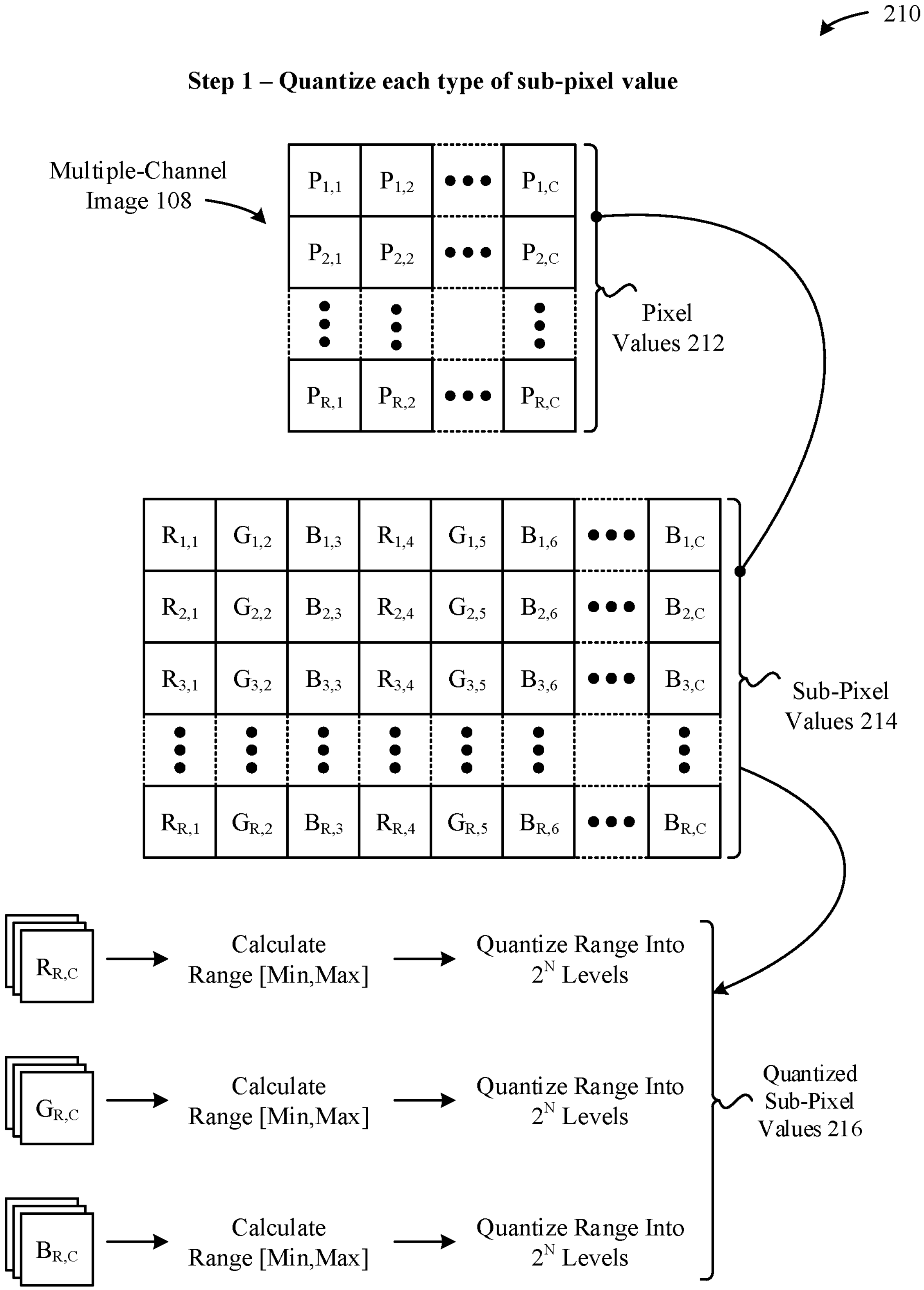

FIGS. 2A-2F illustrate a sequence of conceptual diagrams for pre-processing a multiple-channel image 108 for compression, according to some embodiments. In particular, the conceptual diagrams illustrate a series of steps that the image analyzer 110 can be configured to carry out when pre-processing image data of the multiple-channel image 108 for compression by the compressor(s) 122. FIG. 2A illustrates a conceptual diagram 210 that is implemented by the quantizer 112, according to some embodiments. As shown in FIG. 2A, the multiple-channel image 108 includes a two-dimensional collection of pixel values 212 in a row and column layout, where "R" represents the row value of each pixel "P" and "C" represents the column value of each pixel "P". According to some embodiments, the pixel values 212 can be organized in accordance with a resolution/layout of a display screen 128 included in the display unit 102 such that the collection of pixels can be used to store burn-in statistics associated with the display screen 128. As also shown in FIG. 2A, the pixel values 212 can correspond to a collection of sub-pixel values 214 that are also distributed in a row/column arrangement. For example, the sub-pixel values 214 can be arranged in a red, green, and blue (RGB) pattern (e.g., in accordance with an organization of physical pixels and sub-pixels of the display screen 128). It is noted that this layout is merely exemplary, and that the embodiments set forth herein can be applied to different numbers, layouts, types, etc., of pixel values 212 and sub-pixel values 214.

As noted above, the conceptual diagram 210 illustrates how the quantizer 112 can execute a first step, Step 1, that involves quantizing the different types of sub-pixel values 214 (of the pixel values 212). According to some embodiments, when each pixel value 212 includes a red sub-pixel value 214, a green sub-pixel value 214, and a blue sub-pixel value 214, the quantizer 112 can be configured to: (1) quantize the red sub-pixel values 214 (of the pixel values 212) using a first quantizer, (1) quantize the green sub-pixel values 214 (of the pixel values 212) using a second quantizer, and (3) quantize the blue sub-pixel values 214 (of the pixel values 212) using a third quantizer. According to some embodiments, each of the first, second, and third quantizers can be configured to quantize their respective sub-pixel values 214 in accordance with a range defined by the minimum and maximum values identified across their respective sub-pixel values 214. Moreover, each of the first, second, and third quantizers can be configured with a particular quantization rate that corresponds to an acceptable level of accuracy degradation that will occur as a consequence of the quantization.

Consider, for example, when each sub-pixel value 214 has a depth of thirty-two bits. In this example, a smaller depth—e.g., ten bits per sub-pixel value 214—can be selected to establish one-thousand twenty-four (1024) levels of quantization (within the respective range as defined by the minimum and maximum values) for the sub-pixel value 214. It is noted that the quantizer 112 can be configured in any manner to accommodate additional types of multiple-channel images 108 having different resolutions, layouts (e.g., mismatched lengths and widths), bit-depths, and so on, without departing from the scope of this disclosure. When the quantizer 112 completes the quantization of the sub-pixel values 214 (using the quantizers described above), the sub-pixel values 214 are effectively replaced with quantized sub-pixel values 216, as illustrated in FIG. 2A.

Turning now to FIG. 2B, a conceptual diagram 220 illustrates how the color space transformer 114 can execute a second step, Step 2, that involves performing color space transformation functions 224 on the quantized sub-pixel values 216. In particular, the conceptual diagram 220 illustrates an example step in which different sub-pixel value groups 222 of the quantized sub-pixel values 216 are converted into respective color space transformed sub-pixel value groups 228 of color space transformed sub-pixel values 226. As a brief aside, it is noted that the color space transformations described herein can be beneficial because the overall characteristics of the multiple-channel image 108—which are fundamentally distinct from typical digital images of objects, landscapes, etc.—make it such that color space transformations enable subsequent functions to be applied to ultimately improve the compression ratio of the multiple-channel image 108.

As shown in FIG. 2B, the color space transformation functions 224 can involve carrying out a series of invertible operations on the different red (R), green (G), and blue (B) sub-pixel values included in each of the sub-pixel value groups 222 to produce a respective a luma (Y) value (to the R sub-pixel value), a respective chrominance orange (Co) value (to the G sub-pixel value), and a respective chrominance green (Cg) value (to the B sub-pixel value). In particular, the chrominance orange (Co) value for a color space transformed sub-pixel value group 228 can be established by subtracting the B sub-pixel value (of the sub-pixel value group 222) from the red R sub-pixel value (of the sub-pixel value group 222). The chrominance green (Cg) value for a color space transformed sub-pixel value group 228 can be established by (1) right-shifting the Co value by one position to produce a right-shifted Co value, (2) generating a temporary (U) value by adding the B sub-pixel value (of the sub-pixel value group 222) to the right-shifted Co value, and (3) generating the Cg value by subtracting the U value from the green (G) sub-pixel value (of the sub-pixel value group 222). Additionally, the luma (Y) value for a color space transformed sub-pixel value group 228 can be established by (1) right-shifting the Cg value by one position to produce a right-shifted Cg value, and (2) generating the luma (Y) value by adding the U value to the right-shifted Cg value.

As a brief aside, it is noted that the color space transformation functions 224 are exemplary and not meant to be limiting, and that any amount, type, form, etc., of color space transformation functions can be applied to the quantized sub-pixel values 216, at any level of granularity, to establish color space transformed sub-pixel values 226, consistent with the scope of this disclosure. For example, any form of color space sampling patterns (e.g., Bayer patterns) can be utilized, optional color space predictions can be implemented, and so on. In any case, when the color space transformer 114 completes the color space transformations of the quantized sub-pixel values 216, the quantized sub-pixel values 216 are effectively replaced with color space transformed sub-pixel values 226, as illustrated in FIG. 2B.

Figure 2C:
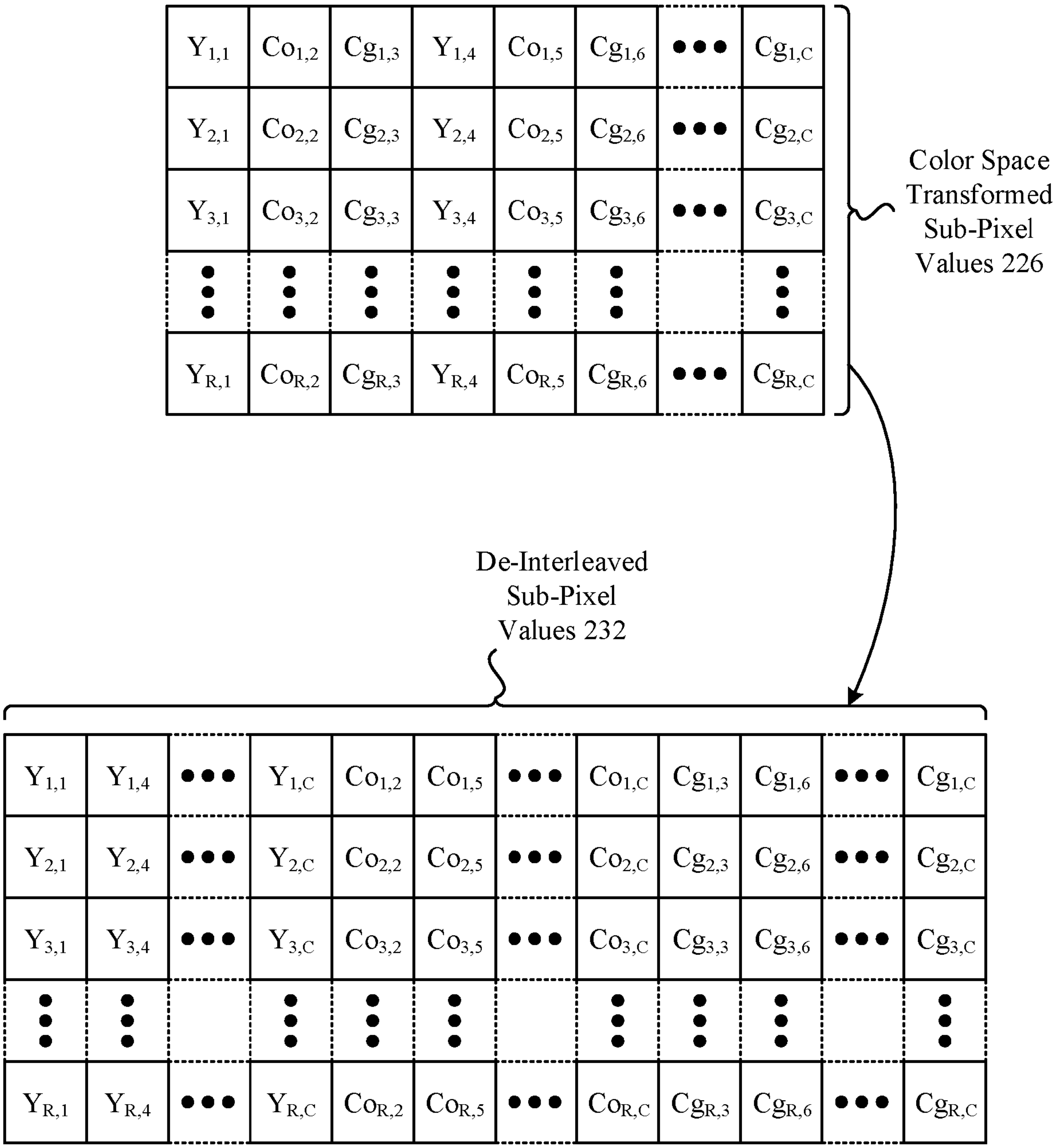

Turning now to FIG. 2C, a conceptual diagram 230 illustrates how the de-interleaver 116 can execute a third step, Step 3, that involves applying a de-interleaving function to the color space transformed sub-pixel values 226. In particular, and as shown in FIG. 2C, the de-interleaving function can involve, for each row of the color space transformed sub-pixel values 226, (1) gathering and adjacently arranging the luma (Y) sub-pixel values of the pixels in the row, (2) gathering and adjacently arranging the chrominance orange (Co) sub-pixel values of the pixels in the row, and gathering and adjacently arranging the chrominance green (Cg) sub-pixel values of the pixels in the row. According to some embodiments, the de-interleaving function can improve the overall accuracy of predictive coding that is subsequently carried out, which can improve the overall compression ratios. In any case, processing the rows of the color space transformed sub-pixel values 226 ultimately yields the de-interleaved sub-pixel values 232 illustrated in FIG. 2C.

Figure 2D:
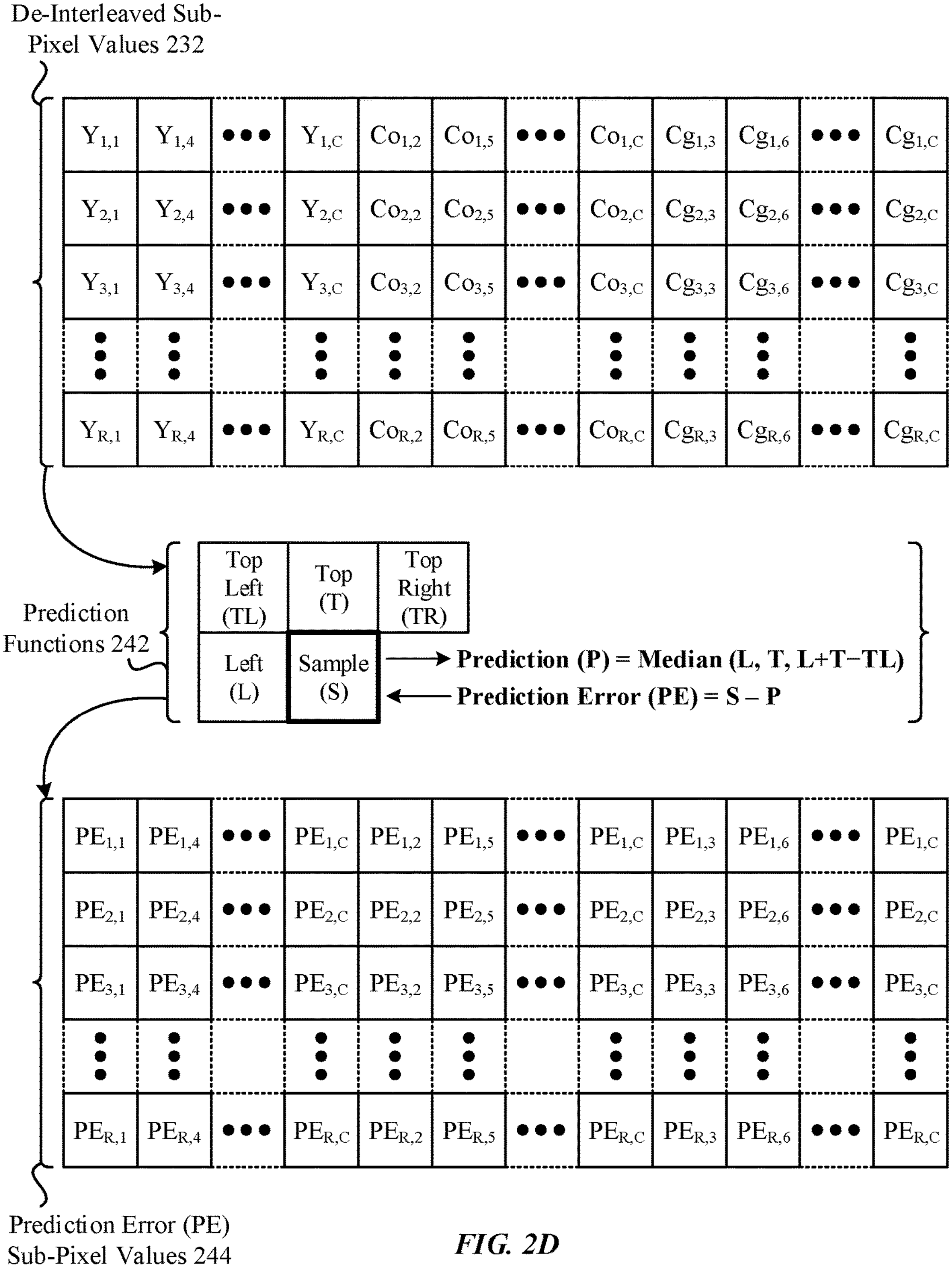

Turning now to FIG. 2D, a conceptual diagram 240 illustrates how the predictor 118 can execute a fourth step, Step 4, that involves performing prediction functions 242 against the de-interleaved sub-pixel values 232 to generate prediction error (PE) sub-pixel values 244. As shown in FIG. 2D, generating a prediction error (PE) sub-pixel value 244 for a particular de-interleaved sub-pixel value 232 (denoted as sample (S) in FIG. 2D) can involve gathering left (L), top left (TL), top (T), and top right (TR) de-interleaved sub-pixel values 232 relative to the particular de-interleaved sub-pixel value 232. Notably, this approach beneficially requires only (portions of) two rows of the de-interleaved sub-pixel values 232 to be stored in memory, which can reduce memory requirements needed for the display unit 102 to implement the prediction functions 242. A prediction (P) value is then calculated based on the median value of L, T, and L+T−TL. In turn, a prediction error (PE) sub-pixel value 244 is calculated by subtracting the prediction (P) value from the particular de-interleaved sub-pixel value 232 (sample (S)). It is noted that the prediction functions 242 illustrated in FIG. 2D are merely exemplary, and that any amount, type, form, etc., of prediction functions can be implemented, at any level of granularity, consistent with the scope of this disclosure. When the predictor 118 completes the predictions on the de-interleaved sub-pixel values 232, the de-interleaved sub-pixel values 232 are effectively replaced with prediction error (PE) sub-pixel values 244, as illustrated in FIG. 2D.

Turning now to FIG. 2E, a conceptual diagram 250 illustrates how the encoder 120 can execute a fifth step, Step 5, that involves performing encoding functions 252 against the prediction error (PE) sub-pixel values 244 to generate encoded prediction error (EPE) sub-pixel values 254. As shown in FIG. 2E, generating an encoded prediction error (EPE) sub-pixel value 254 for a particular prediction error (PE) sub-pixel value 244 can involve gathering left (L), top left (TL), top (T), and top right (TR) prediction error (PE) sub-pixel values 244 relative to the particular prediction error (PE) sub-pixel value 244. These gathered prediction error (PE) sub-pixel values 244 can be utilized to generate three indices to a three-dimensional context (C) by quantizing (L−TL), quantizing (T−TL), and quantizing (TR−T). In particular, the three-dimensional context (C) can store a collection of encoder models (e.g., Golomb-Rice models), where each encoder model corresponds to a unique set of the indices. In this manner, the collection of encoder models can be dynamically selected and applied in accordance with the prediction error (PE) sub-pixel values 244. In any case, at the conclusion of FIG. 2E, the prediction error sub-pixel values 244 are effectively replaced with the encoded prediction error sub-pixel values 254.

As a brief aside, it is noted that, if the underlying multiple-channel image 108 (to which the prediction error (PE) sub-pixel values 244 correspond) exhibits flat (i.e., uniform) areas, then specific combinations of the context (C) and prediction errors (PE) can trigger a run length encoding (RLE) model that can speed up processing and improve compression ratios. According to some embodiments, the RLE model can remain active as long as samples are perfectly predicted (i.e., where the prediction errors (PEs) =0). Moreover, given the quantization of the context (C) is non-linear, additional contexts (C) can be used to distinguish between small gradients within the underlying multiple-channel image 108. This can beneficially increase the probability of perfect predictions, thus increasing the duration through which the RLE model can be utilized. According to some embodiments, the RLE model described herein can utilize an exponential coding scheme with hysteresis, such that relatively few bits are required for long runs, without increasing the bits for short runs. In this regard, the RLE model can beneficially yield substantial compression ratios for multiple-channel images 108 having flat areas, repetitive patterns, and so on.

Figure 2F:
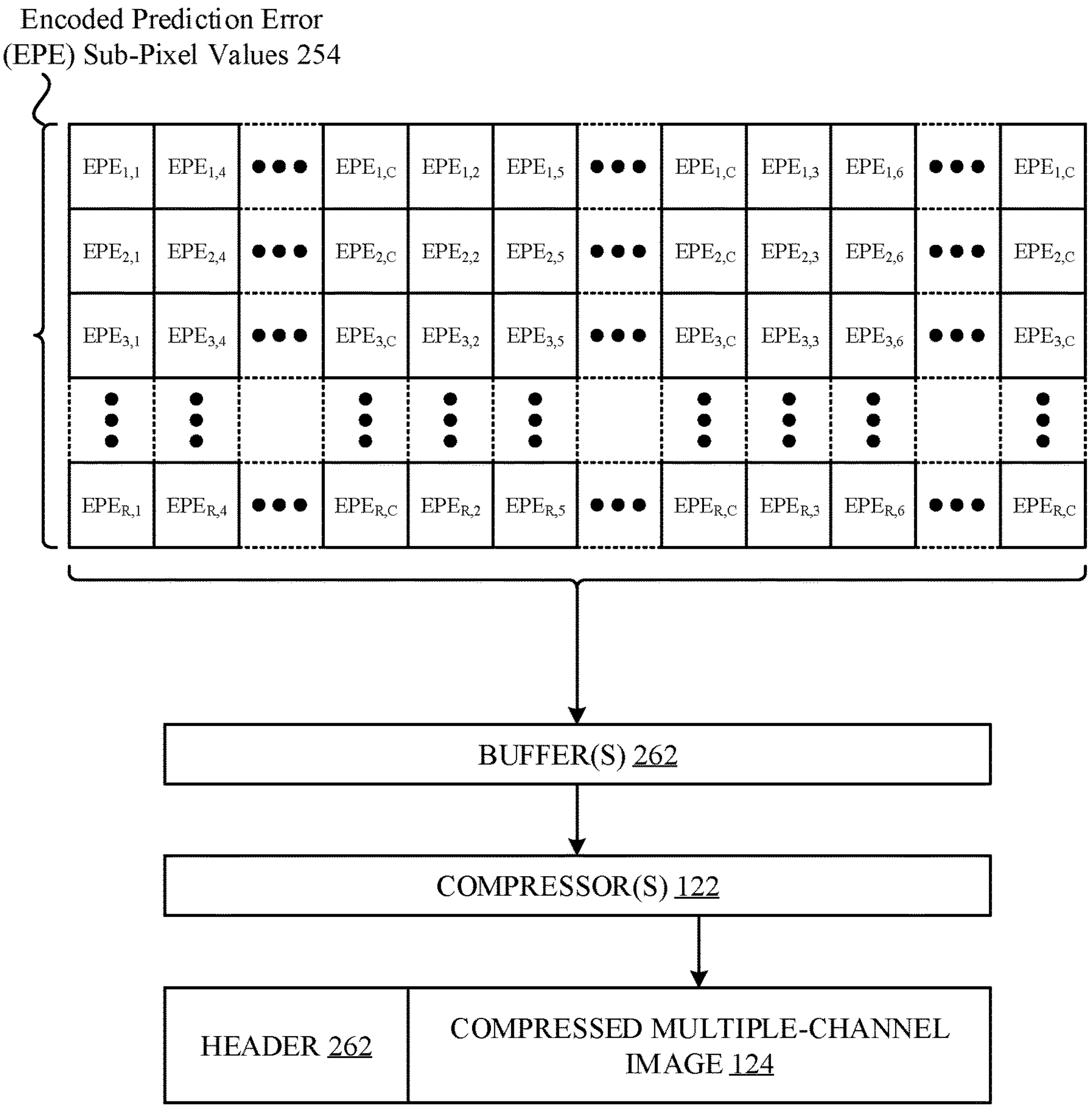

Finally, turning now to FIG. 2F, the conceptual diagram 260 illustrates how the compressor(s) 122 can execute a sixth step, Step 6, that involves compressing the encoded prediction error sub-pixel values 254 to produce a compressed multiple-channel image 124. As shown in FIG. 2F, the encoded prediction error sub-pixel values 254 can be provided to buffer(s) 262 (e.g., as a data stream) according to any number of orders, segmentations, and so on. In turn, the compressor(s) 122 can take action (e.g., when the buffer(s) 262 are filled with data) and compress the contents of the buffer(s) to produce the compressed multiple-channel image 124. Additionally, a header 262 can be generated and appended to the compressed multiple-channel image 124. According to some embodiments, the header can include, for example, dimension and color sampling information, recorded ranges (e.g., min/max values) of the color channels, etc., associated with the multiple-channel image 108, the compressed multiple-channel image 124, and so on. It is noted that the foregoing examples are not meant to be limiting, and that the header 262 can include any amount, type, form, etc., of information, at any level of granularity, consistent with the scope of this disclosure.

The compressed multiple-channel image 124 can be stored into a memory, e.g., the non-volatile memory 126 of the display unit 102 described above in conjunction with FIG. 1. In turn, when the display unit 102 seeks to implement burn-in adjustments, the display unit 102 can perform the techniques described herein, in reverse fashion, against the compressed multiple-channel image 124 to yield a corresponding uncompressed multiple-channel image 108 (from which the compressed multiple-channel image 124 was originally derived).

To summarize, various embodiments of techniques for pre-processing image data for compression are disclosed. According to some embodiments, the techniques include receiving the image data, where the image data comprises a plurality of pixels, and each pixel of the plurality of pixels comprises a plurality of sub-pixel values. According to some embodiments, the sub-pixel values can be modified through various quantization, color space transformation, and de-interleaving operations. In turn, prediction values can be generated for the modified sub-pixel values, and respective encoding models can be identified and employed to encode the prediction values to yield modified image data. In some cases, the modified image data is arranged, and possesses particular characteristics, such that when it is compressed, a substantially improved compression ratio can be achieved in comparison to the compression ratio that otherwise would achieved when compressing the (unmodified) image data.

Figure 3:
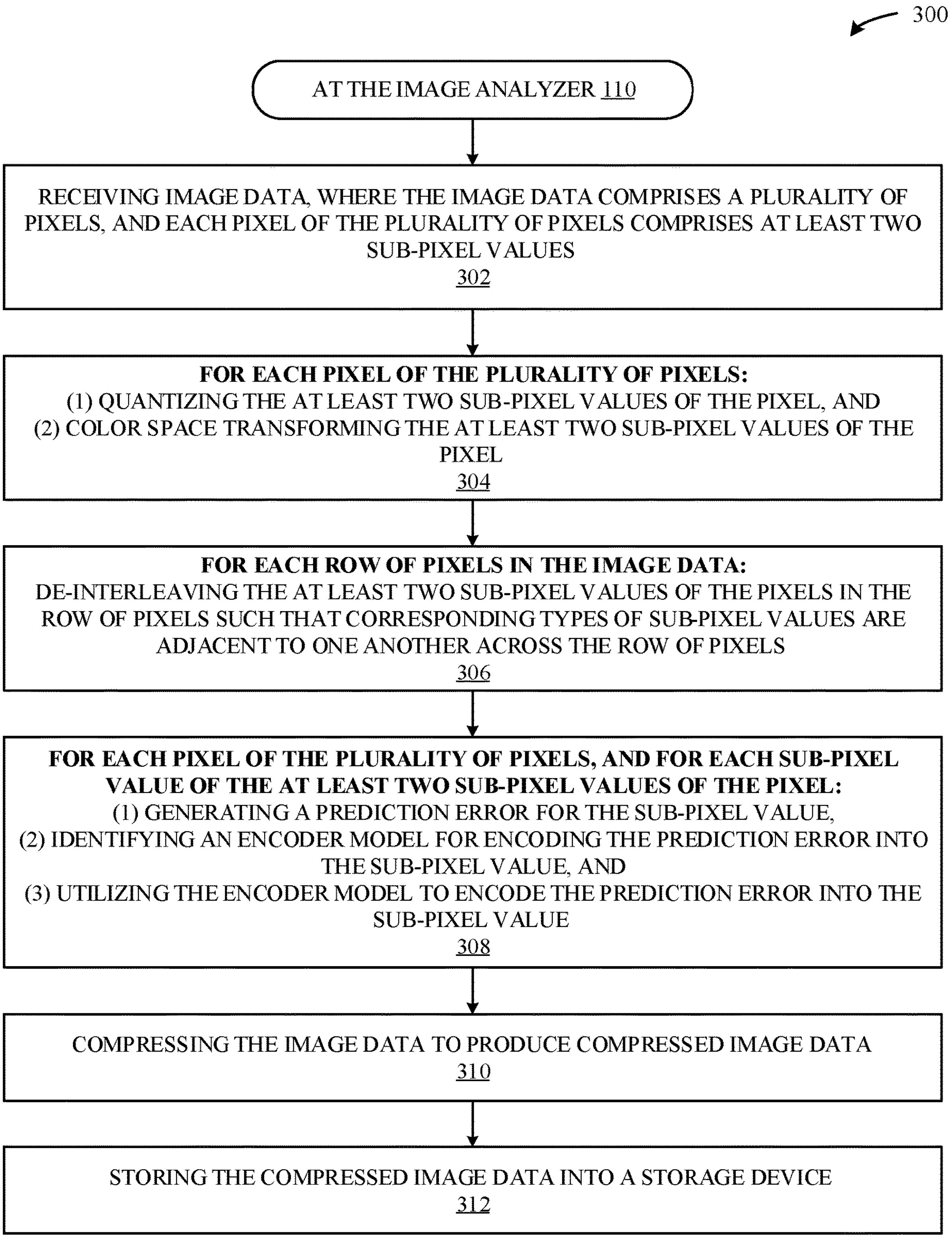
FIG. 3 illustrates a method for pre-processing image data for compression, according to some embodiments.

FIG. 3 illustrates a method 300 for pre-processing image data for compression, according to some embodiments. As shown in FIG. 3, the method 300 begins at step 302, the image analyzer 110 receives image data, where the image data comprises a plurality of pixels, and each pixel of the plurality of pixels comprises at least two sub-pixel values (e.g., as described above in conjunction with FIG. 2A).

At step 304, the image analyzer 110 carries out the following steps for each pixel of the plurality of pixels: (1) quantizing the at least two sub-pixel values of the pixel, and (2) color space transforming the at least two sub-pixel values of the pixel (e.g., as described above in conjunction with FIGS. 2A-2B).

At step 306, the image analyzer 110 carries out the following step for each row of pixels in the image data: de-interleaving the at least two sub-pixel values of the pixels in the row of pixels such that corresponding types of sub-pixel values are adjacent to one another across the row of pixels (e.g., as described above in conjunction with FIG. 2C).

At step 308, the image analyzer 110 carries out the following steps for each pixel of the plurality of pixels, and for each sub-pixel value of the at least two sub-pixel values of the pixel: (1) generating a prediction error for the sub-pixel value, (2) identifying an encoder model for encoding the prediction error into the sub-pixel value, and (3) utilizing the encoder model to encode the prediction error into the sub-pixel value (e.g., as described above in conjunction with FIGS. 2D-2E).

At step 310, the image analyzer 110 compresses the image data to produce compressed image data (e.g., as described above in conjunction with FIG. 2F). At step 312, the image analyzer 110 stores the compressed image data into a storage device (e.g., the non-volatile memory 126 discussed above in conjunction with FIG. 1).

Referring now to FIG. 4, a block diagram illustrating an example embodiment of a device 400 is shown. In various embodiments, device 400 may implement functionality of the display unit 102 as depicted in FIG. 1, a computing device in which the display unit 102 is included (and which is configured to implement all or a portion of the techniques described herein), or the like. In some embodiments, elements of device 400 may be included within a system on a chip. In some embodiments, device 400 may be included in a mobile device, which may be battery-powered. Therefore, power consumption by device 400 may be an important design consideration. In the illustrated embodiment, device 400 includes fabric 410, compute complex 420, input/output (I/O) bridge 450, cache/memory controller 445, graphics unit 475, and display unit 465. In some embodiments, device 400 may include other components (not shown) in addition to, or in place of, the illustrated components, such as video processor encoders and decoders, image processing or recognition elements, computer vision elements, etc.

Fabric 410 may include various interconnects, buses, MUX's, controllers, etc., and may be configured to facilitate communication between various elements of device 400. In some embodiments, portions of fabric 410 may be configured to implement various different communication protocols. In other embodiments, fabric 410 may implement a single communication protocol and elements coupled to fabric 410 may convert from the single communication protocol to other communication protocols internally.

In the illustrated embodiment, compute complex 420 includes bus interface unit (BIU) 425, cache 430, and cores 435 and 440. In various embodiments, compute complex 420 may include various numbers of processors, processor cores and caches. For example, compute complex 420 may include 1, 2, or 4 processor cores, or any other suitable number. In one embodiment, cache 430 is a set associative L2 cache. In some embodiments, cores 435 and 440 may include internal instruction and data caches. In some embodiments, a coherency unit (not shown) in fabric 410, cache 430, or elsewhere in device 400 may be configured to maintain coherency between various caches of device 400. BIU 425 may be configured to manage communication between compute complex 420 and other elements of device 400. Processor cores such as cores 435 and 440 may be configured to execute instructions of a particular instruction set architecture (ISA) which may include operating system instructions and user application instructions. These instructions may be stored in a computer readable medium such as a memory coupled to memory controller 445 discussed below.

As used herein, the term "coupled to" may indicate one or more connections between elements, and a coupling may include intervening elements. For example, in FIG. 4, graphics unit 475 may be described as "coupled to" a memory through fabric 410 and cache/memory controller 445. In contrast, in the illustrated embodiment of FIG. 4, graphics unit 475 is "directly coupled" to fabric 410 because there are no intervening elements.

Cache/memory controller 445 may be configured to manage transfer of data between fabric 410 and one or more caches and memories. For example, cache/memory controller 445 may be coupled to an L3 cache, which may, in turn, be coupled to a system memory. In other embodiments, cache/memory controller 445 may be directly coupled to a memory. In some embodiments, cache/memory controller 445 may include one or more internal caches. Memory coupled to cache/memory controller 445 may be any type of volatile memory, such as dynamic random-access memory (DRAM), synchronous DRAM (SDRAM), double data rate (DDR, DDR2, DDR3, etc.) SDRAM (including mobile versions of SDRAMs such as mDDR3, etc., and/or low power versions of SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to cache/memory controller 445 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 420 to cause the computing device to perform functionality described herein.

Graphics unit 475 may include one or more processors, e.g., one or more graphics processing units (GPUs). Graphics unit 475 may receive graphics-oriented instructions, such as OPENGL®, Metal®, or DIRECT3D® instructions, for example. Graphics unit 475 may execute specialized GPU instructions or perform other operations based on the received graphics-oriented instructions. Graphics unit 475 may generally be configured to process large blocks of data in parallel and may build images in a frame buffer for output to a display, which may be included in the device or may be a separate device. Graphics unit 475 may include transform, lighting, triangle, and rendering engines in one or more graphics processing pipelines. Graphics unit 475 may output pixel information for display images. Graphics unit 475, in various embodiments, may include programmable shader circuitry which may include highly parallel execution cores configured to execute graphics programs, which may include pixel tasks, vertex tasks, and compute tasks (which may or may not be graphics-related).

Display unit 465 may be configured to read data from a frame buffer and provide a stream of pixel values for display. Display unit 465 may be configured as a display pipeline in some embodiments. Additionally, display unit 465 may be configured to blend multiple frames to produce an output frame. Further, display unit 465 may include one or more interfaces (e.g., MIPI® or embedded display port (eDP)) for coupling to a user display (e.g., a touchscreen or an external display).

I/O bridge 450 may include various elements configured to implement: universal serial bus (USB) communications, security, audio, and low-power always-on functionality, for example. I/O bridge 450 may also include interfaces such as pulse-width modulation (PWM), general-purpose input/output (GPIO), serial peripheral interface (SPI), and inter-integrated circuit (I2C), for example. Various types of peripherals and devices may be coupled to device 400 via I/O bridge 450.

In some embodiments, device 400 includes network interface circuitry (not explicitly shown), which may be connected to fabric 410 or I/O bridge 450. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 400 with connectivity to various types of other devices and networks.

Figure 5:
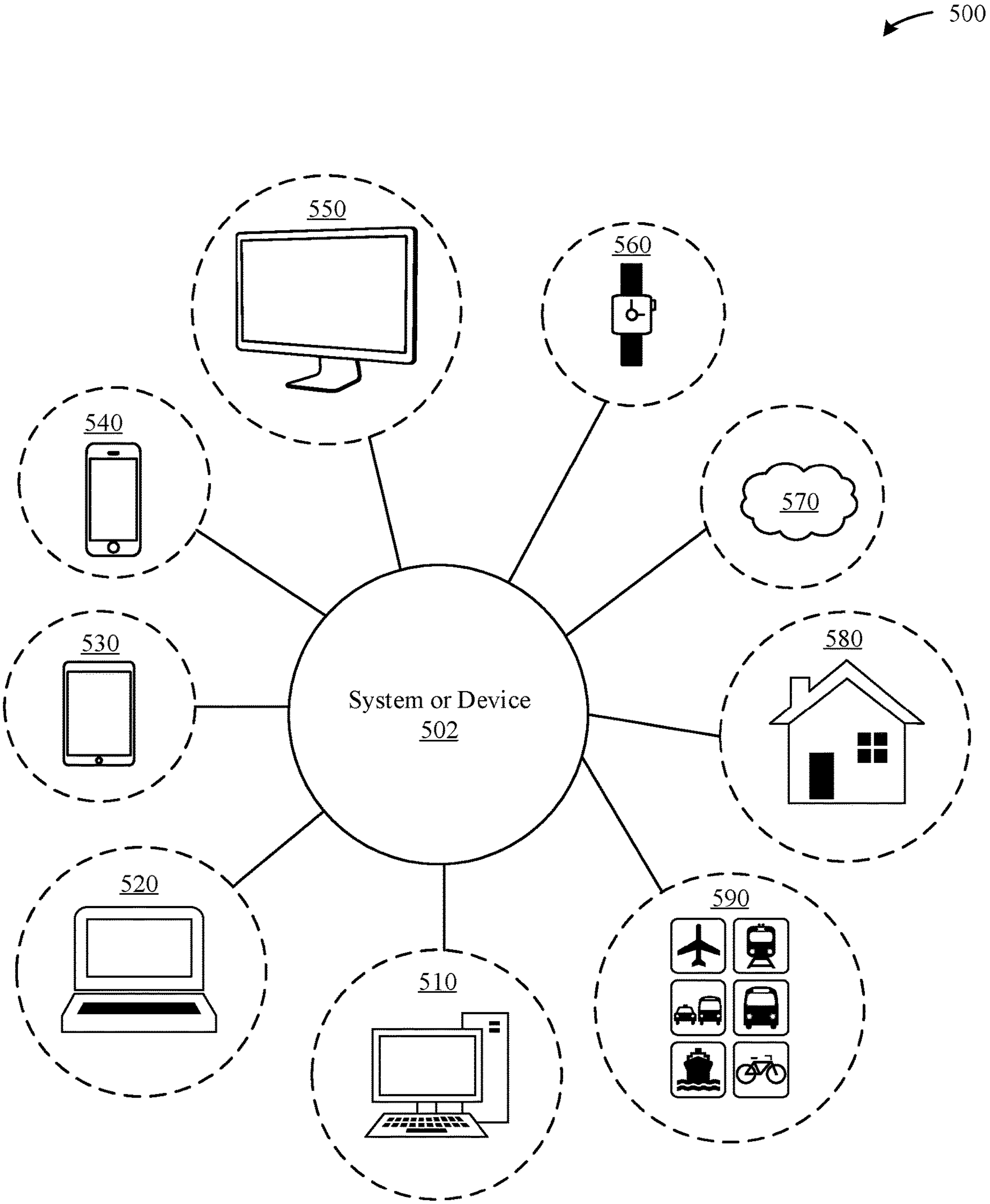
FIG. 5 illustrates a block diagram of various embodiments types of systems that may include the display unit of FIG. 1, according to some embodiments.

FIG. 5 illustrates a block diagram 500 of various types of systems that may include any of the devices described herein. System or device 502, which may incorporate or otherwise utilize one or more of the techniques described herein, may be utilized in a wide range of areas. For example, system or device 502 may be utilized as part of the hardware of systems such as a desktop computer 510, laptop computer 520, tablet computer 530, cellular or mobile phone 540, or television 550 (or set-top box coupled to a television).

Similarly, disclosed elements may be utilized in a wearable device 560, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 502 may also be used in various other contexts. For example, system or device 502 may be utilized in the context of a server computer system, such as a dedicated server or on shared hardware that implements a cloud-based service 570. Still further, system or device 502 may be implemented in a wide range of specialized everyday devices, including devices 580 commonly found in the home such as refrigerators, thermostats, security cameras, etc. The interconnection of such devices is often referred to as the "Internet of Things" (IoT). Elements may also be implemented in various modes of transportation. For example, system or device 502 could be employed in the control systems, guidance systems, entertainment systems, etc. of various types of vehicles 590.

The applications illustrated in FIG. 5 are merely exemplary and are not intended to limit the potential future applications of disclosed systems or devices. Other example applications include, without limitation: portable gaming devices, music players, data storage devices, unmanned aerial vehicles, etc.

The present disclosure has described various example circuits in detail above. It is intended that the present disclosure cover not only embodiments that include such circuitry, but also a computer-readable storage medium that includes design information that specifies such circuitry.

Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 6:
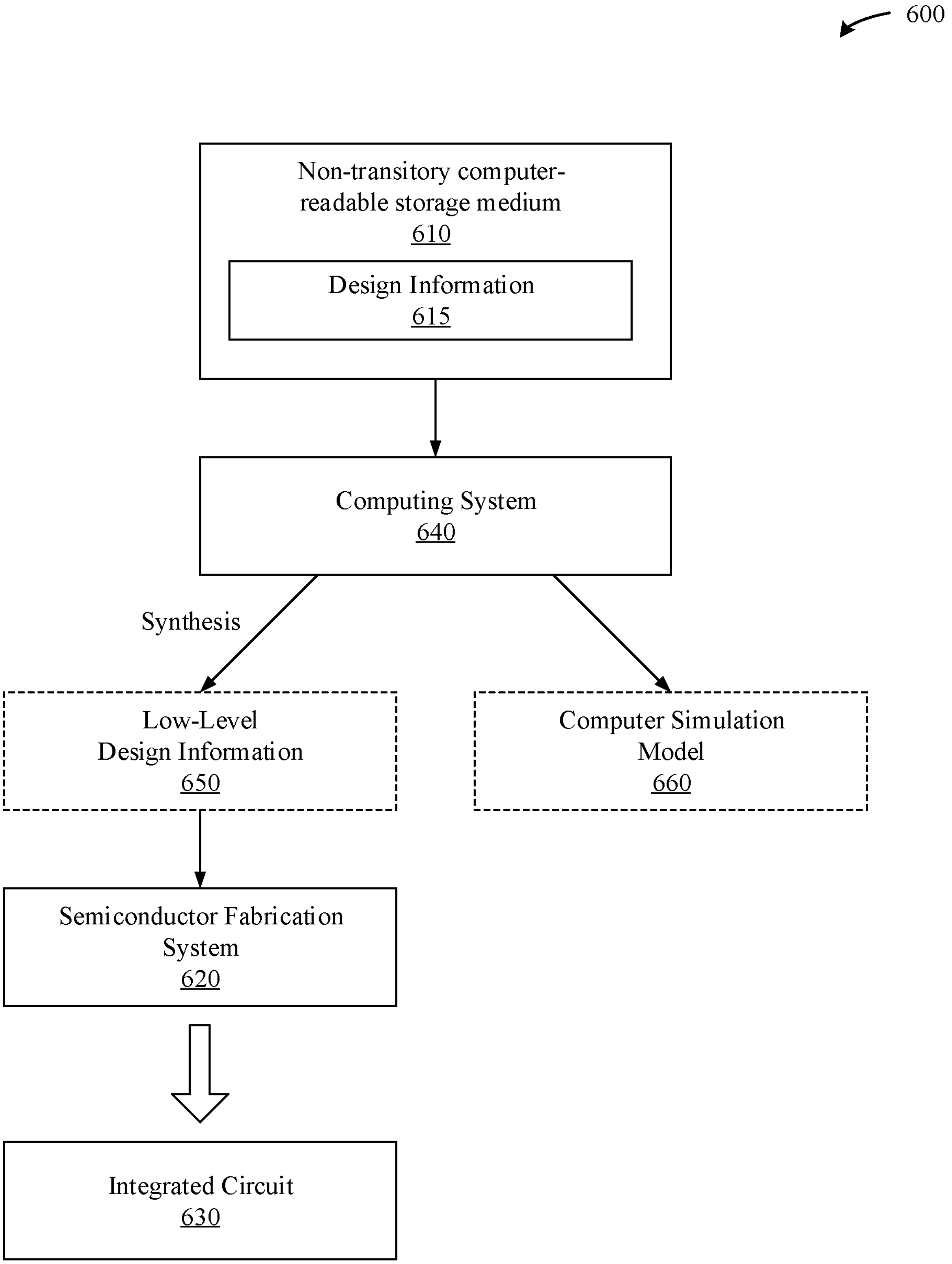
FIG. 6 illustrates an example of a non-transitory computer-readable storage medium that stores information for implementing the techniques described herein, according to some embodiments.

FIG. 6 illustrates a block diagram 600 of an example of a non-transitory computer-readable storage medium that stores circuit design information 615, according to some embodiments. In the illustrated embodiment, computing system 640 is configured to process design information 615. This may include executing instructions included in design information 615, interpreting instructions included in design information 615, compiling, transforming, or otherwise updating design information 615, etc. Therefore, design information 615 controls computing system 640 (e.g., by programming computing system 640) to perform various operations discussed below, in some embodiments.

In the illustrated example, computing system 640 processes design information 615 to generate both computer simulation model 660 of integrated circuit 630 and low-level design information 650. In other embodiments, computing system 640 may generate only one of these outputs, may generate other outputs based on design information 615, or both. Regarding computer simulation model 660, computing system 640 may execute instructions of a hardware description language that includes register transfer level (RTL) code, behavioral code, structural code, or some combination thereof. The simulation model may perform the functionality specified by design information 615, facilitate verification of the functional correctness of the hardware design, generate power consumption estimates, generate timing estimates, etc.

In the illustrated example, computing system 640 also processes design information 615 to generate low-level design information 650 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on low-level design information 650 (potentially among other inputs), semiconductor fabrication system 620 is configured to fabricate integrated circuit 630 (which may correspond to functionality of the computer simulation model 660). Note that computing system 640 may generate different simulation models based on design information at various levels of description, including low-level design information 650, design information 615, and so on. The data representing low-level design information 650 and computer simulation model 660 may be stored on non-transitory computer readable storage medium 610, or on one or more other media.

In some embodiments, the low-level design information 650 controls (e.g., programs) semiconductor fabrication system 620 to fabricate integrated circuit 630. Thus, when processed by the fabrication system, the design information may program the fabrication system to fabricate a circuit that includes various circuitry disclosed herein.

Non-transitory computer-readable storage medium 610 may comprise any of various appropriate types of memory devices or storage devices. Non-transitory computer-readable storage medium 610 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 610 may include other types of non-transitory memory as well or combinations thereof. Accordingly, non-transitory computer-readable storage medium 610 may include two or more memory media; such media may reside in different locations—for example, in different computer systems that are connected over a network.

Design information 615 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 640, semiconductor fabrication system 620, or both. In some embodiments, design information 615 may also include one or more cell libraries that specify the synthesis, layout, or both of integrated circuit 630. In some embodiments, design information 615 is specified in whole, or in part, in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 630 may, in various embodiments, include one or more custom macrocells, such as memories, analog or mixed-signal circuits, and the like. In such cases, design information 615 may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 620 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 620 may also be configured to perform various testing of fabricated circuits for correct operation.

In various embodiments, integrated circuit 630 and computer simulation model 660 are configured to operate according to a circuit design specified by design information 615, which may include performing any of the functionality described herein. Further, integrated circuit 630 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model does not imply that the instructions must be executed in order for the element to be met, but rather, specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by design information 615. The different circuit implementations may affect the performance, area, power consumption, etc. of a given design (potentially with tradeoffs between different design goals), but the logical function does not vary among the different circuit implementations of the same circuit design.

In some embodiments, the instructions included in design information 615 provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information included in low-level design information 650. Low-level design information 650 may program semiconductor fabrication system 620 to fabricate integrated circuit 630.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third," when applied to a feature, do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors, or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, a circuit, or a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), a functional unit, a memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as a structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits, or portions thereof, may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method for pre-processing image data for compression, the method comprising, by a computing device:

receiving the image data, wherein the image data comprises a plurality of pixels, and each pixel of the plurality of pixels comprises at least two sub-pixel values;

for each pixel of the plurality of pixels:

quantizing the at least two sub-pixel values of the pixel, and color space transforming the at least two sub-pixel values of the pixel;

for each row of pixels in the image data:

de-interleaving the at least two sub-pixel values of the pixels in the row of pixels such that corresponding types of sub-pixel values are adjacent to one another across the row of pixels;

for each pixel of the plurality of pixels, and for each sub-pixel value of the at least two sub-pixel values of the pixel:

generating a prediction error for the sub-pixel value, identifying an encoder model for encoding the prediction error into the sub-pixel value, and utilizing the encoder model to encode the prediction error into the sub-pixel value;

compressing the image data to produce compressed image data; and storing the compressed image data into a storage device.

2. The method of claim 1, wherein quantizing a given sub-pixel value of the at least two sub-pixel values of a given pixel of the plurality of pixels comprises:

identifying, based on (i) the sub-pixel value, and (ii) other sub-pixel values of the plurality of pixels that correspond to the sub-pixel value, a numerical range of values;

segmenting the numerical range of values into a plurality of levels; and quantizing the sub-pixel value to a respective level of the plurality of levels that corresponds to the sub-pixel value.

3. The method of claim 2, wherein the plurality of levels is based two raised to a power of a predefined quantization bit rate.

4. The method of claim 1, wherein, when each pixel of the plurality of pixels comprises red, green, and blue sub-pixel values, color space transforming the red, green, and blue sub-pixel values comprises:

generating a chrominance orange (Co) sub-pixel value by subtracting the blue sub-pixel value from the red sub-pixel value;

right-shifting the Co sub-pixel value by one position to produce a right-shifted Co sub-pixel value;

generating a temporary (U) sub-pixel value by adding the blue sub-pixel value to the right-shifted Co sub-pixel value;

generating a chrominance green (Cg) sub-pixel value by subtracting the U sub-pixel value from the green sub-pixel value;

right-shifting the Cg sub-pixel value by one position to produce a right-shifted Cg sub-pixel value; and generating a luma (Y) sub-pixel value by adding the U sub-pixel value to the right-shifted Cg sub-pixel value.

5. The method of claim 4, wherein, for a given row of pixels in the image data, de-interleaving the at least two sub-pixel values of the pixels in the row of pixels such that corresponding types of sub-pixel values are adjacent to one another across the row of pixels comprises:

adjacently arranging all luma (Y) sub-pixel values of the pixels in the row, adjacently arranging all chrominance orange (Co) sub-pixel values of the pixels in the row, and adjacently arranging all chrominance green (Cg) sub-pixel values of the pixels in the row.

6. The method of claim 1, wherein generating the prediction error for a given sub-pixel value of a given pixel comprises:

identifying, among the de-interleaved sub-pixel values, top left (TL), top (T), top right (TR), and left (L) sub-pixel values relative to the sub-pixel value;

calculating a prediction (P) value by identifying a median of (i) the L sub-pixel value, (ii) the T sub-pixel value, and (ii) a first result of adding, to the L sub-pixel value, a second result of subtracting the TL sub-pixel value from the T sub-pixel value; and calculating the prediction error value by subtracting the P value from the sub-pixel value.

7. The method of claim 6, wherein identifying the encoder model for encoding the prediction error into the sub-pixel value comprises:

producing a first value by quantizing the TL sub-pixel value subtracted from the L sub-pixel value;

producing a second value by quantizing the TL sub-pixel value subtracted from the T sub-pixel value;

producing a third value by quantizing the T sub-pixel value subtracted from the TR sub-pixel value;

identifying an index that corresponds to the first, second, and third values; and utilizing the index to identify, among a plurality of encoder models associated with respective indexes, the encoder model associated with the index.

8. The method of claim 1, wherein the image data comprises at least one segment of a multiple-channel digital image or comprises the multiple-channel digital image.

9. A system configured to pre-process image data for compression, the system comprising:

a storage device; and processing circuitry configured to:

receive the image data, wherein the image data comprises a plurality of pixels, and each pixel of the plurality of pixels comprises at least two sub-pixel values;

for each pixel of the plurality of pixels:

quantize the at least two sub-pixel values of the pixel, and color space transform the at least two sub-pixel values of the pixel;

for each row of pixels in the image data:

de-interleave the at least two sub-pixel values of the pixels in the row of pixels such that corresponding types of sub-pixel values are adjacent to one another across the row of pixels;

for each pixel of the plurality of pixels, and for each sub-pixel value of the at least two sub-pixel values of the pixel:

generate a prediction error for the sub-pixel value, identify an encoder model for encoding the prediction error into the sub-pixel value, and utilize the encoder model to encode the prediction error into the sub-pixel value;

compress the image data to produce compressed image data; and store the compressed image data into the storage device.

10. The system of claim 9, wherein the processing circuitry comprises a processor configured to execute instructions.

11. The system of claim 9, wherein:

the system comprises a display panel; and the compressed image data comprises pixel wear data associated with the display panel.

12. The system of claim 9, wherein quantizing a given sub-pixel value of the at least two sub-pixel values of a given pixel of the plurality of pixels comprises:

identifying, based on (i) the sub-pixel value, and (ii) other sub-pixel values of the plurality of pixels that correspond to the sub-pixel value, a numerical range of values;

segmenting the numerical range of values into a plurality of levels; and quantizing the sub-pixel value to a respective level of the plurality of levels that corresponds to the sub-pixel value.

13. The system of claim 12, wherein the plurality of levels is based two raised to a power of a predefined quantization bit rate.

14. The system of claim 9, wherein, when each pixel of the plurality of pixels comprises red, green, and blue sub-pixel values, color space transforming the red, green, and blue sub-pixel values comprises:

generating a chrominance orange (Co) sub-pixel value by subtracting the blue sub-pixel value from the red sub-pixel value;

right-shifting the Co sub-pixel value by one position to produce a right-shifted Co sub-pixel value;

generating a temporary (U) sub-pixel value by adding the blue sub-pixel value to the right-shifted Co sub-pixel value;

generating a chrominance green (Cg) sub-pixel value by subtracting the U sub-pixel value from the green sub-pixel value;

right-shifting the Cg sub-pixel value by one position to produce a right-shifted Cg sub-pixel value; and generating a luma (Y) sub-pixel value by adding the U sub-pixel value to the right-shifted Cg sub-pixel value.

15. The system of claim 14, wherein, for a given row of pixels in the image data, de-interleaving the at least two sub-pixel values of the pixels in the row of pixels such that corresponding types of sub-pixel values are adjacent to one another across the row of pixels comprises:

adjacently arranging all luma (Y) sub-pixel values of the pixels in the row, adjacently arranging all chrominance orange (Co) sub-pixel values of the pixels in the row, and adjacently arranging all chrominance green (Cg) sub-pixel values of the pixels in the row.

16. The system of claim 9, wherein generating the prediction error for a given sub-pixel value of a given pixel comprises:

identifying, among the de-interleaved sub-pixel values, top left (TL), top (T), top right (TR), and left (L) sub-pixel values relative to the sub-pixel value;

calculating a prediction (P) value by identifying a median of (i) the L sub-pixel value, (ii) the T sub-pixel value, and (ii) a first result of adding, to the L sub-pixel value, a second result of subtracting the TL sub-pixel value from the T sub-pixel value; and calculating the prediction error value by subtracting the P value from the sub-pixel value.

17. The system of claim 16, wherein identifying an encoder model for encoding the prediction error into the sub-pixel value comprises:

producing a first value by quantizing the TL sub-pixel value subtracted from the L sub-pixel value;

producing a second value by quantizing the TL sub-pixel value subtracted from the T sub-pixel value;

producing a third value by quantizing the T sub-pixel value subtracted from the TR sub-pixel value;

identifying an index that corresponds to the first, second, and third values; and utilizing the index to identify, among a plurality of encoder models associated with respective indexes, the encoder model associated with the index.

18. The system of claim 9, wherein the image data comprises at least one segment of a multiple-channel digital image or comprises the multiple-channel image.

19. A non-transitory computer readable storage medium configured to store instructions that, when executed by at least one processor included in a computing device, cause the computing device to pre-process image data for compression, by carrying out steps that include:

receiving the image data, wherein the image data comprises a plurality of pixels, and each pixel of the plurality of pixels comprises at least two sub-pixel values;

for each pixel of the plurality of pixels:

quantizing the at least two sub-pixel values of the pixel, and color space transforming the at least two sub-pixel values of the pixel;

for each row of pixels in the image data:

de-interleaving the at least two sub-pixel values of the pixels in the row of pixels such that corresponding types of sub-pixel values are adjacent to one another across the row of pixels;

for each pixel of the plurality of pixels, and for each sub-pixel value of the at least two sub-pixel values of the pixel:

generating a prediction error for the sub-pixel value, identifying an encoder model for encoding the prediction error into the sub-pixel value, and utilizing the encoder model to encode the prediction error into the sub-pixel value;

compressing the image data to produce compressed image data; and storing the compressed image data into a storage device.

20. The non-transitory computer readable storage medium of claim 19, wherein:

the computing device comprises a display panel; and the compressed image data comprises pixel wear data associated with the display panel.

* * * * *